Aug. 29, 1961  H. S. McCONKIE  2,998,055
TUBELESS TIRE MOUNTING DEVICE
Filed Jan. 17, 1958  2 Sheets-Sheet 1
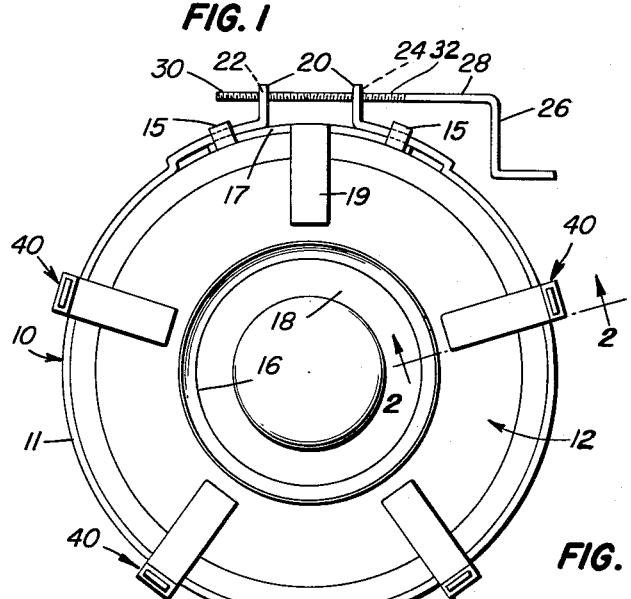
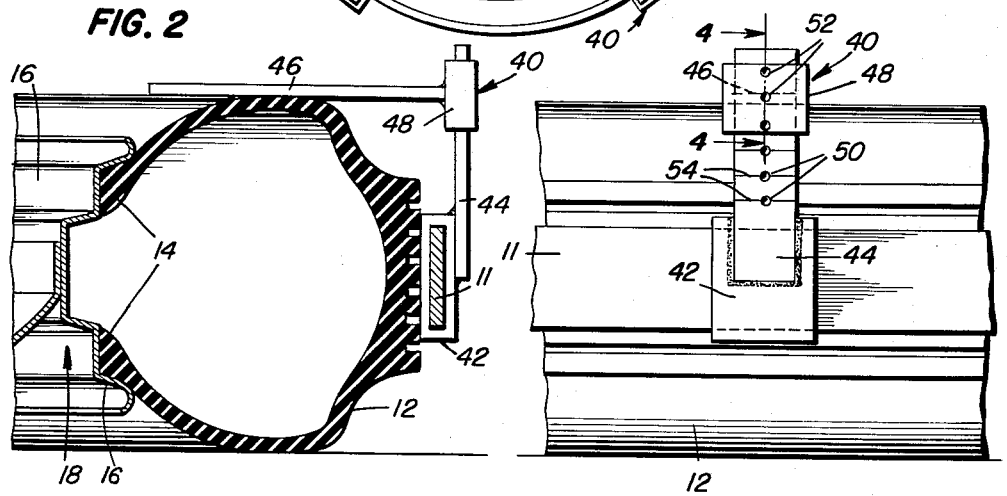
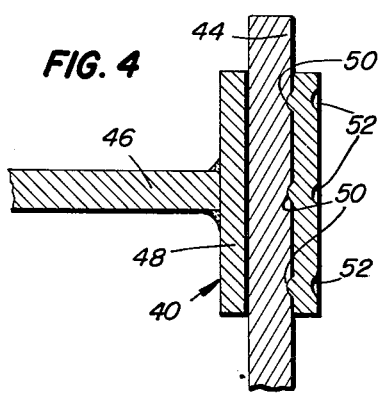
INVENTOR
Howard S. McConkie
BY
ATTORNEY Aug. 29, 1961  H. S. McCONKIE  2,998,055
TUBELESS TIRE MOUNTING DEVICE
Filed Jan. 17, 1958  2 Sheets-Sheet 2

INVENTOR
Howard S. McConkie
BY
ATTORNEY

United States Patent Office 2,998,055
Patented Aug. 29, 1961

2,998,055
TUBELESS TIRE MOUNTING DEVICE
Howard S. McConkie, 7 Pelham St., Fort Bragg, N.C.
Filed Jan. 17, 1958, Ser. No. 709,572
3 Claims. (Cl. 157—1.21)

This invention relates to automotive accessories and more particularly to an improved tool for installing tubeless tires to wheel rims with drop centers.

Many automotive vehicles are now being equipped with tubeless tires, which are channel shaped in cross section and held to the wheel rim by the outward pressure developed when the tire is inflated, the wheel rim being the closure member for the open portion of the tire channel. When a tire is installed, the tire rests loosely in the wheel rim and is difficult, if not impossible, to inflate or reinflate, because the loose engagement of the tire with the rim permits leakage of the inflating air. To overcome this difficulty, there have been provided a number of compression tools of the type which include a ring or loop of strap metal or cable which may be applied to the periphery of the tire at the tread and shortened to squeeze the tire toward the center of the wheel. This effects a bulging of the side walls of the tire to move its free, beaded edges in air sealing engagement against the rim. Such tools have certain disadvantages. For example, it is necessary to apply the loop manually, to accurately position it along the center of the tire tread, and to hold it in this position until the loop has been shortened sufficiently to squeeze the tire. This generally requires the effort of two men; one to position and hold the loop, and the other to take up the loop by means of a lever, rachet, drum or similar device.

It is a primary object of this invention to provide a tool, of the character indicated, so constructed as to obviate the stated disadvantages.

Another object of the invention is to provide a tire compressing tool which is formed with means for automatically guiding the tool to the correct position on the tire, and for holding it in this position so that the tool may be operated to install a tire by one man alone.

A further object of the invention is to provide a tire installing device, of the character indicated, having adjustable means for properly positioning and holding the tool on the tire, and which permits the tool to be used to install tires of different size.

A still further object of the invention is to provide a tire installing device having adjustable means for positioning and holding the device on the tire and means for indicating the proper adjustments for different tire sizes.

A still further object of the invention is to provide a tire mounting tool having adjustable means for positioning and holding the device on the tire, in which said adjustable means are provided with releasable, locking elements to permit ready release and adjustment to a tire of different size.

Still another object of the invention is to provide a tire mounting device, of the character indicated, which is simple in construction, economical to manufacture, and efficient in operation.

Yet another object of the invention is to provide, for loop-type tire compression tools of the kind indicated, a guiding, positioning, and holding element which is adjustable to position the loop properly with respect to tires of different size and which may be added to the loop of such tools and/or the device for tightening the loop.

The novel features that are considered characteristic of the invention are set forth with particularity in the appended claims. The invention, itself, however, both as to its organization and its method of operation, together with additional objects and advantages thereof, will best be understood from the following description of several embodiments when read in connection with the accompanying drawings, wherein like reference characters indicate like parts throughout the several figures and in which:

FIG. 1 is a top plan view of a device embodying the invention, and showing the device being employed to install a tubeless tire to the rim of an automobile wheel horizontally supported;

FIG. 2 is an enlarged cross section taken substantially on line 2—2 of FIG. 1;

FIG. 3 is an elevational view of the tool positioning and holding member looking to the left in FIG. 2;

FIG. 4 is a greatly enlarged sectional view taken on line 4—4 of FIG. 3;

Figure 5:
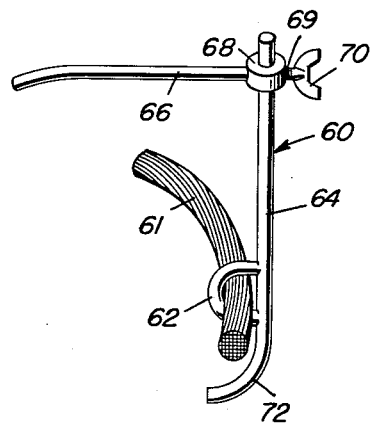
FIG. 5 is a perspective view of a modified, adjustable, positioning and holding member as applied to a cable type, tire compression tool.

Referring now to the drawings, there is shown in FIG. 1 a tire compression or bead spreading tool 10, including a split band 11 of inextensible material, such as thin, spring steel. Band 11 is looped about the periphery of a tubeless tire 12 whose inner, free beaded edges 14, FIG. 2, are being pressed into sealing engagement with the corresponding bead seating edges 16 of a wheel rim 18.

The free ends 20 of loop 11, which are provided with oppositely threaded openings 22 and 24, are passed through collars 15 on a holding member 17. An angle arm 19 extends from member 17 in its plane and then at right angle thereto to engage the side wall of tire 12 and center the loop. Preferably, arm 19 is made adjustable for different tire sizes in a manner to be described in connection with the adjustable clamps disclosed hereinafter.

A crank 26, having an axle 28, extends through openings 22 and 24. The outermost portion 30 of axle 28 is provided with right-hand threads and the inner portion 32 with left-hand threads for co-action respectively with openings 22 and 24. Turning the crank handle 26 clockwise will serve to draw together the free ends 20 of the band 11, squeezing the tire 12 toward the center of the wheel rim and, together with injected air pressure, bulging the tire beads 14, from their position shown in FIG. 6, outwardly into air sealing engagement with the rim flange 16, as shown in FIG. 2.

Slidably mounted on band 11 over its free ends 20 are a plurality of adjustable positioning and holding members or clamps 40. Each adjustable clamp 40 includes a rectangular sleeve 42 which slidably receives band 11. Affixed to sleeve 42 is an axially extending leg 44 which is substantially parallel to the axis of loop 11. A finger 46 extends radially of the loop 11 and is slidable on leg 44 by means of the sleeve 48. The leg 44 is provided with a number of depressions 50, in its outer face, which cooperate with detents 52 depressed inwardly from the outer wall of sleeve 48. The detents 52 seat in the recesses 50 to releasably hold finger 46 at a desired adjusted height corresponding to a given size of tire. This requires that the depressions 50 be properly spaced along the length of support 44 so as to accurately position the finger 46 for each size of tire. Preferably, the outer surface of the support member 44 is provided with tire size markings as indicated at 54, FIG. 3, so that upon reading the topmost, visible, tire size under sleeve 48, the operator may determine for which tire the clamp 40 is set.

In use of the improved tool 10 for mounting a tire 12 on rim 18, the operator first adjusts the individual clamps 40 for the size tire to be mounted. This can be done by simply grasping the guide finger 46 and sliding it along support member 44 until the appropriate tire size is indicated below the sleeve 48. In moving finger 46, a slight pressure is necessary to overcome the friction of the detents 52 in the openings 50, but once the appropriate position has been reached, the detents will seat in different openings and releasably detain the finger 46 in the appropriate position.

With the tire and rim assembly in a horizontal position on a tire changer or on the floor, or in a vertical position on the axle of the vehicle, the operator slips the loosened loop 11 around the tire and pushes the loop until the fingers 46 engage the side of the tire casing. Fingers 46, having been appropriately adjusted for the tire being mounted, position the band 11 exactly in the center of the tire and grip the tire to hold it in this position while the crank handle 26 is being turned by the operator to squeeze the tire. As the circumference of band 11 is shortened, the band first grasps the outer periphery of the tire tread sufficiently to firmly fix the tool on the tire, and as the circumference of the loop is further shortened, distorts the tire tread uniformly, radially inwardly around the periphery. This distortion is transmitted to the side walls of the tire in a manner which expands the beads 14 oppositely outwardly into air sealing relation with the flanges 16 of rim 18. At this point, the operator may apply air to the interior of the tire by means of an air hose and valve stem on the rim, not shown, until sufficient internal tire pressure is applied to maintain the air seal. Crank handle 26 may then be turned in the opposite direction to loosen the loop 11 and remove the loop 10 and clamps 40 from the tire. Preferably, the legs 44 and fingers 46 are made of a flexible material such as sheet metal, so that these elements will bend slightly when the tire casing is bowed by the pressure exerted by band 11.

The tire squeezing device 10, upon removal from the installed tire, is ready to be placed upon another tire of the same size to repeat the operation. If it is desired to install a tire of different size, the same operation may be repeated, but first the operator adjusts the fingers 46 of clamps 40 for the appropriate tire size. Since the clamps 40 are formed with a supporting sleeve 42 which is slidable on a band, such as 11, the clamps 40 may be readily added to the bands of similar loop type tire tools not so equipped.

In FIG. 5, there is shown another embodiment of the invention. Adjustable clamp 60, which may be used in place of clamp 40, is applied to a cable type of loop 61 having a round or circular cross section, in place of the rectangular, straplike band 11, shown in FIG. 1. Clamp 60 comprises a collar 62 slidable on the loop cable 61. Collar 62 is affixed to a rodlike support leg 64, on which is adjustably mounted the rod finger 66 at right angles thereto. Finger 66 is provided with a collar 68 which slides on rod 64. An opening 69 is provided in the collar which threadedly receives a screw 70 having a butterfly type, grasping head.

The position of finger 66 on leg 64 may be adjusted to that appropriate to any given tire size by releasing the wing screw 70, sliding the finger 66 to the appropriate position, which may be indexed as in FIG. 3, and then tightening the screw 70. Any known cable tightening means may be used, or structure similar to that used in connection with FIGS. 1–4 may be used with any necessary minor changes. The clamps 60 and cable 61 may be used by following the identical procedure set forth above in connection with the embodiment illustrated in FIGS. 1–4. Preferably, leg 64 has an extension 72 below collar 62 and cable 61 to engage the tread of the tire being mounted and somewhat limit the distortion applied to the tire tread by take up of cable 61. Thus, leg 64 is kept substantially vertical when the tire being mounted is horizontal.

Figure 6:
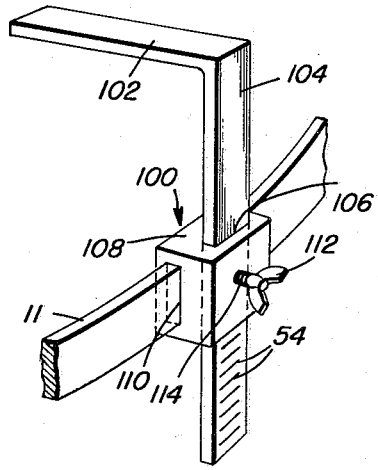
FIG. 6 is a perspective view showing a modified adjustable clamp.

In FIG. 6 there is illustrated a modification of the clamping member in which the adjustment for various size tires is made at the loop of the tire compressing tool rather than by adjustment of clamp elements spaced therefrom as in FIGS. 2 and 5. Clamp 100 comprises an inverted L-shaped angle member having a finger 102 adapted to engage the side of the tire casing and fixed at substantially right angles to a leg 104 which is slidable in a slot 106 in collar 108. The collar 108 is suitably secured in fixed or sliding engagement to the loop of the compression tool whether it be of strap metal or cable.

In FIG. 6, collar 108 is illustrated as having a second slot 110 for slidably receiving the strap 11. Slot 110 is spaced from and transverse to slot 106. The position of finger 102 may be adjusted to that appropriate to any given tire size by operation of a wing screw 112 which passes through an aperture 114 in collar 108 to engage the clamp leg 104. Preferably, the face of leg 104 is provided with markings 54, of tire sizes or inches which measure one half the diameter of the tire cross section. These markings, as explained in connection with FIG. 3, enable the operator to adjust and set the clamp for the appropriate size tire by reading the topmost, visible, marking under collar 108.

Although several embodiments of the invention have been shown and described, it is obvious that many modifications thereof are possible. The invention, therefore, is not to be restricted except insofar as is necessitated by the prior art and by the spirit of the appended claims.

What is claimed and desired to be secured by Letters Patent is:

1. A device for squeezing a tubeless tire casing about a vehicle wheel to sealingly engage the bead of the tire with the wheel rim to permit of inflating the tire, comprising a loop for application to the periphery of the tire casing substantially at the medial plane thereof, said loop having radially outwardly offset end portions and laterally outwardly bent ears terminating such end portions with such ears being spaced apart when the loop is applied to a tire, an arcuate holding member bridging the gap between said end portions of the loop to form a complete circle therewith and with the end portions of said holding member underlying said offset end portions of the loop, a collar carried by each end portion of said holding member and engaging a respective end portion of said loop to permit of relative sliding movement between the holding member and loop, means engaging said ears to move the same toward and away from each other to adjust the length of the loop circumference, and tire side wall engaging means to permit the assembly to be dropped in place over a tire casing and position said loop substantially at the medial plane of the casing, said means comprising a series of legs adjustably mounted on said loop in circumferentially spaced relation therearound and extending in an axial direction therefrom a distance greater than the distance from the medial plane of a tire casing to the side wall thereof, a side wall engaging finger carried by each leg and projecting radially inwardly therefrom for resting upon the side wall of a tire casing, and means cooperative with said legs for adjustably fixing each finger in selectively spaced relation from said loop.

2. The device as described in claim 1 wherein said finger is rigidly affixed to said leg, said means being in the form of a collar slidably received on said loop and being provided with an opening therethrough slidably receiving an associated leg, and means releasably engaged between said collar and the associated leg to fix the spacing of the finger from said loop.

3. A device for squeezing a tubeless tire casing about a vehicle wheel to sealingly engage the bead of the tire with the wheel rim to permit of inflating the tire, comprising a loop for application to the periphery of the tire casing substantially at the medial plane thereof, said loop having radially outwardly offset end portions and laterally outwardly bent ears terminating such end portions with such ears being spaced apart when the loop is applied to a tire, an arcuate holding member bridging the gap between said end portions of the loop to form a complete circle therewith and with the end portions of said holding member underlying said offset end portions of the loop, a collar carried by each end portion of said holding member and engaging a respective end portion of said loop to permit of relative sliding movement between the holding member and loop, means engaging said ears to move the same toward and way from each other to adjust the length of the loop circumference, and tire side wall engaging means to permit the assembly to be dropped in place over a tire casing and position said loop substantially at the medial plane of the casing, said means comprising a series of legs adjustably mounted on said loop in circumferentially spaced relation therearound and extending in an axial direction therefrom to a distance greater than the distance from the medial plane of a tire casing to the side wall thereof, a sleeve slidably mounted on each leg, a side wall engaging finger rigid with each sleeve and projecting radially inwardly therefrom for resting upon the side wall of a tire casing, and means for adjustably fixing each sleeve to its associated leg, the last means comprising cooperatively mating detent elements on said leg and in said sleeve, respectively, there being a plurality of said elements spaced longitudinally of said leg, each sleeve being sufficiently loosely fitted on its associated leg as to permit movement of said sleeve along said leg and retention thereof in selected position by the mating of cooperatively juxtaposed detent elements.

References Cited in the file of this patent

UNITED STATES PATENTS

| | | |
|---|---|---|
| 413,178 | Doe | Oct. 22, 1889 |
| 459,637 | Lee | Sept. 15, 1891 |
| 705,964 | Rhodes | July 29, 1902 |
| 960,415 | Schalkle | June 7, 1910 |
| 1,236,059 | Dahlman | Aug. 7, 1917 |
| 1,912,587 | MacDonald et al. | June 6, 1933 |
| 2,177,279 | Holub | Oct. 24, 1939 |
| 2,603,993 | Holm | July 22, 1952 |
| 2,684,112 | Coats | July 20, 1954 |
| 2,778,415 | Murray | Jan. 22, 1957 |
| 2,815,804 | Thomas | Dec. 10, 1957 |
| 2,886,099 | Bishman | May 12, 1959 |